Nov. 5, 1935. C. E. FOWLER 2,019,667
ROTATABLE ADMISSION AND CUT-OFF VALVE
Filed June 28, 1932  3 Sheets-Sheet 1
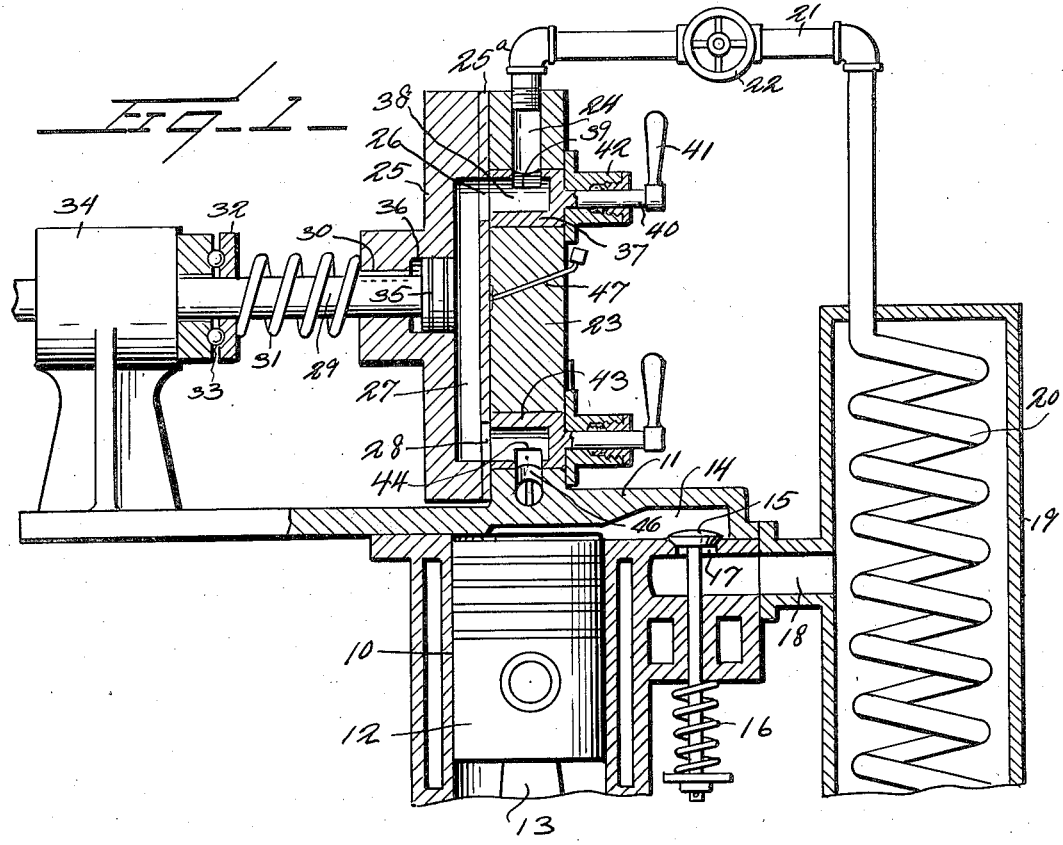
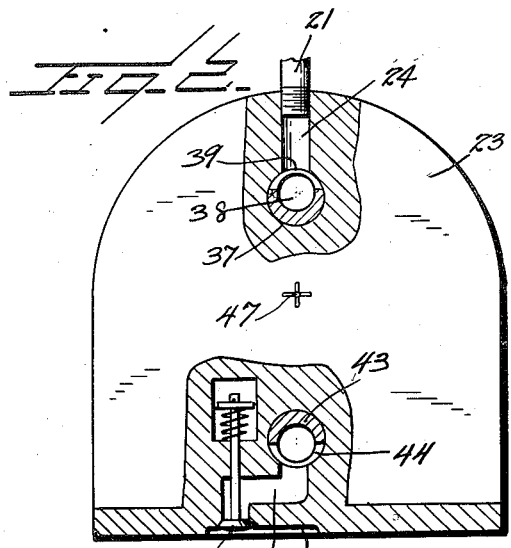
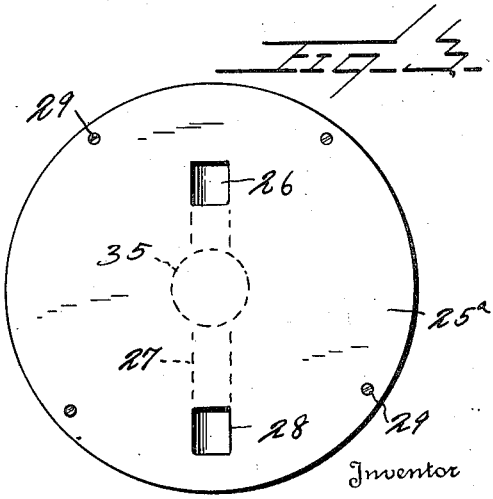
Inventor
C. E. Fowler
By Watson E. Coleman
Attorney

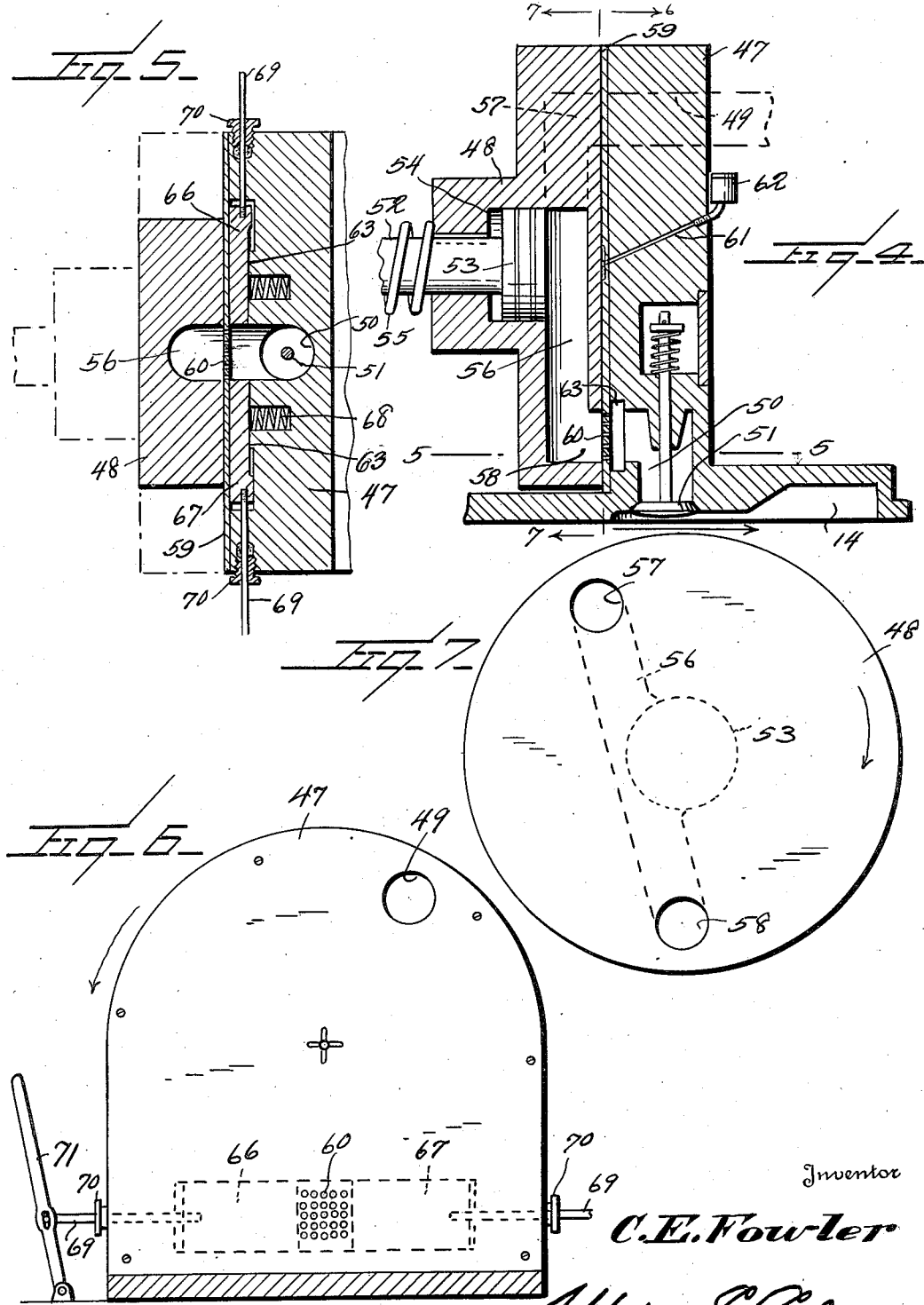

Nov. 5, 1935.  C. E. FOWLER  2,019,667
ROTATABLE ADMISSION AND CUT-OFF VALVE
Filed June 28, 1932   3 Sheets-Sheet 3
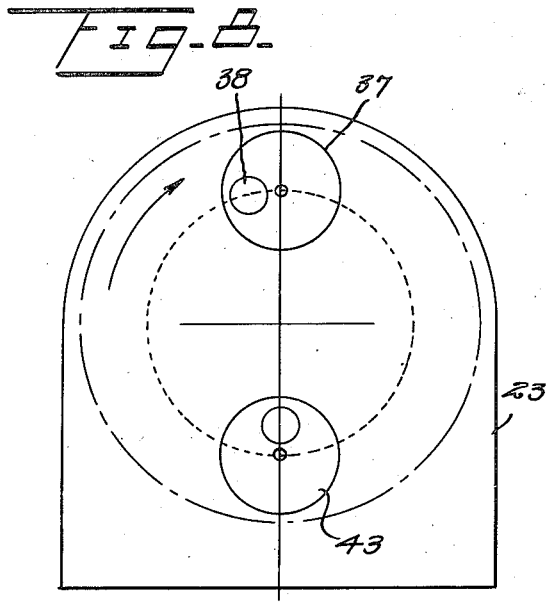
Early Cutoff
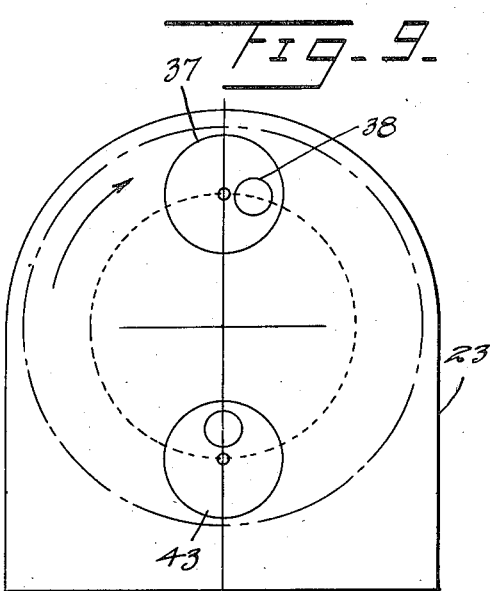
Late Admission
Late Cutoff
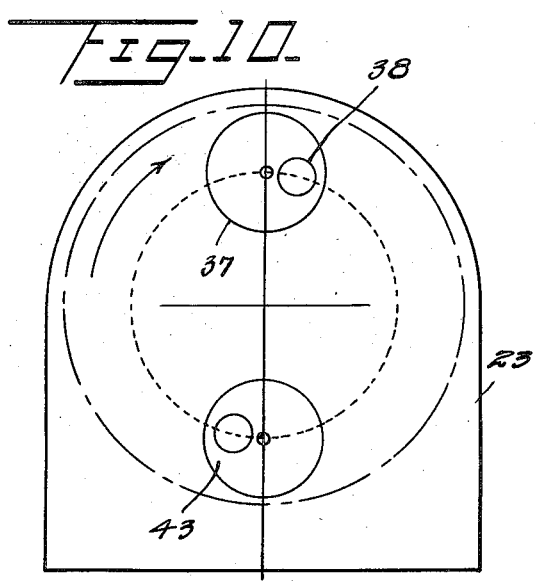
Changed Timing
Period
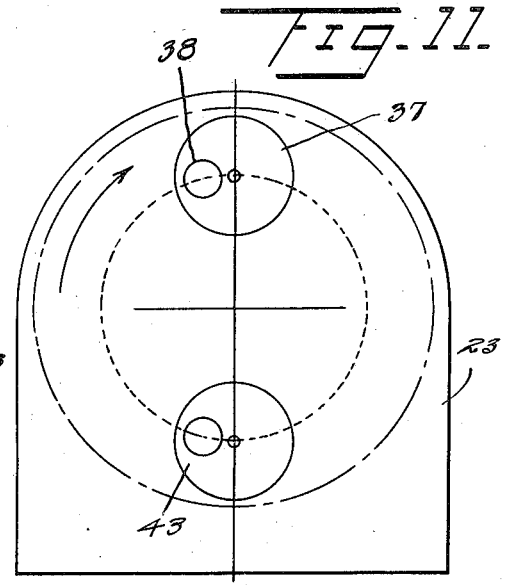
Admission Period Shortened
Inventor
A. E. Fowler
By Watson E. Coleman
Attorney Patented Nov. 5, 1935

2,019,667

UNITED STATES PATENT OFFICE 2,019,667

ROTATABLE ADMISSION AND CUT-OFF VALVE

Clarence E. Fowler, Cleveland, Ohio, assignor of one-half to Harry M. Fowler, Los Angeles, Calif.

Application June 28, 1932, Serial No. 619,750

15 Claims. (Cl. 121—140)

This invention relates to engine valves and particularly to valves for cutting off and admitting steam or other motive fluid to the engine.

The general object of this invention is to provide a valve designed to be used in connection with a high speed internal combustion engine for admitting steam after a full internal combustion cycle has been completed to thereby permit the engine to be steam driven for one complete steam cycle and then cut off the steam to permit the engine to be driven as an internal combustion engine and particularly to provide a rotatable valve for this purpose in which the "cut off" may be adjustably varied to permit the steam to be used more or less expansively as may be desired.

A further object is to provide an adjustable cut off means in such a rotatable valve which is so formed that there shall be a minimum of friction and in which there shall be no leakage or seepage of the steam into the cylinder of the engine during the intake portion of the cycle while the engine is acting as an internal combustion engine.

A still further object is to provide a valve of this character with adjustable cut-off means and adjustable means for controlling the inlet or admission period to thus provide means whereby the admission of steam may be advanced or retarded and whereby the cut off may be advanced or retarded.

Other objects will appear in the course of the following description.

My invention is illustrated in the accompanying drawings, wherein:—

Figure 1 is a vertical sectional view through a portion of an internal combustion engine and the valve therefor and through the steam generating means;

Figure 2 is a face view of the valve casing partly broken away;

Figure 3 is a face view of the rotative element of the valve;

Figure 4 is a vertical sectional view through a modified form of valve;

Figure 5 is a section on the line 5—5 of Figure 4;

Figure 6 is a face view of the stationary portion of the valve shown in Figure 4 on a section taken along the line 6—6 of Figure 4;

Figure 7 is a section on the line 7—7 of Figure 4 and showing a face view of the rotatable valve element.

Figures 8, 9, 10 and 11 are diagrammatic views showing various positions of the eccentric valves.

The eccentricity of the ports in the eccentric valves are exaggerated in these figures.

Referring now particularly to Figures 1 to 3, it will be seen that I have illustrated my valve in connection with an internal combustion engine, the cylinder of which is designated 10 and the head of which is designated 11. Operating within the cylinder is the usual piston 12 and connecting rod 13, the crank case and allied parts not being shown. The engine is illustrated as having an inlet duct 14 in its head and having any suitable means whereby motive fluid may be admitted to the duct 14. This means is not shown as it is well-known.

Figure 1 shows, however, the exhaust valve 15 designated 15 which is of the same character as the inlet valve and is held closed by a spring 16 in the usual manner and is operated by cams or any other suitable means, not shown, in the usual manner.

The valve 15 controls an exhaust port 17 opening into an exhaust passage 18 in turn opening into the interior of a steam generating shell 19 within which is disposed the coil 20. Coil 20 is connected at one end to a suitable source of water (not shown) and its other end is connected by the pipe 21 to one element of my valve mechanism. The pipe 21 is provided with the usual throttle valve 22 or any valve of like character whereby the steam may be throttled or cut off entirely.

So far, the structure which has been described is not part of my invention. My invention resides in the provision of a rotatable valve structure whereby steam may be supplied to the cylinder 10 ever so often, this steam supply occurring after a complete internal combustion cycle, the steam being admitted with the piston in the position shown in Figure 12, acting to force the piston downward, the steam being discharged upon the upward movement of the piston and through the exhaust passages 14 and 18. The broad idea of providing a steam cycle with an internal combustion cycle is not new with me.

My invention resides in the valve whereby this inlet of steam is accomplished. To this end, I provide a stationary member 23 having a port opening 24 communicating with the pipe 21.

Coacting with the stationary member 23 is a rotatable disk 25 having therein a port 26 opening into a diametrically extending passage 27 which at its end terminates in a discharge port 28. This disk 25 in order to provide the longitudinal passage 27 is shown as formed in two sections 25 and 25a, the section 25a being attached to the body section 25 in any suitable manner, as for instance, by the screws 29 shown in Figure 3. This section 25a is made detachable.

The disk 25 is mounted to rotate upon a shaft 29 by means of the spline 30, this spline permitting longitudinal movement of the element 25 upon the shaft. This longitudinal movement is resisted by means of the coiled compression spring 31 which bears against a thrust plate 32 in turn supported by anti-friction elements 33 against the end of the shaft bearing 34. The shaft is rotated at any desired speed and by any suitable power, preferably by means actuated by the engine itself. The inner end of this shaft carries upon it a piston 35 having piston rings and disposed within a recess 36 concentric to the axial center of the shaft. The spring 31 forces the flat face of the rotatable valve 25 against the flat face of the element 23.

The ratio of revolution between the valve and the crank shaft is exactly one revolution of the valve to three revolutions of the crank-shaft when applied to a four cycle internal combustion motor and the gas cycle cam shaft is also one to three making a six stroke cycle. The valve operates on the fifth stroke of the engine only for a four cycle engine or, in other words, the timing of the steam admission valve shown in my drawings relative to the crank shaft when applied to a four cycle internal combustion engine is as follows:—

The first down stroke of the engine piston, intake of combustion fuel; second up stroke, compression; third down stroke, ignition and power stroke; fourth up stroke, exhaust of burned gases; fifth down stroke, admission of steam under pressure through my valve; sixth, up stroke, exhaust of steam, that is, its discharge through port 18, the valve 15 being mechanically lifted at this time.

Disposed within the element 23 is a hollow cut-off valve designated generally 37 having an eccentrically disposed bore 38. This bore registers with the port 26 at each rotation of the disk 25 and it will be observed that the port 26 has a radial length substantially equal to the diameter of the valve 37 to thus be capable of registering with the bore 38 in all positions of the bore. This eccentric valve 37 is formed with an arcuate port 39 which is at all times in coincidence with the passage 24 to admit steam.

While I do not wish to be limited to this, I preferably provide an eccentric valve 43 in the lower end of the stationary element 23 which coacts with the valve 37 in a manner which will be later stated. The valve 43 is constructed in the same manner as eccentric valve 37 and operates in the same way but with relation to the port 28. The wall of this valve 43 is provided with the arcuate slot 44 as shown in Figure 2, which slot permits the passage of steam downward into the space 14.

The valves 37 and 43 are each provided with an axially disposed stem 40 having a handle 41 and extending out through a stuffing box 42 formed on the member 23. It will be obvious now that by rotating the valve 37 by means of the handle 41, the eccentricity of the bore 38 will cause the bore to be shifted in the direction of rotation of the member 25 or in an opposite direction. Shifting the valve 37 in a direction to carry its bore 38 in an opposite direction to the direction of rotation of disc 25 causes the valve to "cut-off" earlier in the rotation of the valve than if the valve bore is centered on the line passing through the diametrical center of rotor 25 and port 44. If the valve 37 is shifted to carry its bore in the same direction as the direction of rotation of the rotor 25 the effect will be to keep the admission of steam to occur later. By using the two eccentrically variable valves 37 and 43, it is possible to obtain the following variations at will:—

(1) When the valve 37 is in the position shown in Figure 8, it will cause the cut-off to occur earlier in the rotation of the rotor 25 without changing the point of admission, that is, without changing the position of the valve 44 from its normal position.

(2) By moving valve 37 in the same direction as the direction of rotation of the rotor 25 it causes admission of steam to occur later in the cycle and causes the point of cut off to occur later also, the valve 44 remaining in its normal position. This is shown in Figure 9.

(3) Changing the time at which admission and cut-off takes place is secured, as shown in Figure 10, by moving both valves 37 and 44 in the same direction whether this direction is reverse to the direction of movement of the rotor or in the same direction as the movement of the rotor. This, however, does not change the length of time during which admission of steam takes place.

(4) The period of admission of steam is shortened as shown in Figure 11, by moving the valve 37 in a direction opposite to the direction of rotation of the rotor and moving valve 44 from its normal position in the direction of rotation of the rotor.

The maximum period of admission is obtained when both the valves 37 and 44 are centered on a line passing through the center of rotor 33. In Figures 8 to 11 the eccentricity of the bores in the valves 37 and 43 has been much exaggerated so as to make the diagrams clear. It is to be understood, of course, that the ports 26 and 28 are of sufficient area to extend substantially over the extremities of the valves 37 and 43 and thus these ports will sweep over the opening of the bores of these eccentric valves in any position in which these bores are placed. Thus the point of cut-off may be advanced or retarded very delicately and thus the steam may be admitted to the cylinder through only a portion of the stroke and then cut off to allow the steam to act expensively for the remainder of the stroke or the steam may be allowed to enter during the whole stroke of the piston 12. By making the port 26 larger than the bore 38, the bore 38 will always register with the port 26 in all positions of the eccentric valve 37.

It will be noted by Figure 2 that a check valve 45 is provided seating against the wall of the space 14 and that the port 46 leading from the valve 43 opens through the seat of this check valve. The check valve is designed for the purpose, of course, of preventing any passage of combustion products from the cylinder back into the rotatable valve while the engine is functioning as an internal combustion engine and preventing the explosion from forcing the element 25a tighter against the face of the element 23 and also, of course, holding the steam within the cylinder 10 when the steam has been admitted. It will be understood that the contacting faces between the section 25a of the rotatable element 25 and the opposed face of the element 23 are ground to a tight, close fit and that lubricating means is to be provided between these two contacting faces, this lubricating means being indicated as a lubricant duct 47 connected to a grease cup or oil cup.

The purpose of the piston 35 in this combination is to balance by pressure the rotatable element 25 so that the pressure of the steam entering this rotatable element will not act to force the rotatable element rearward away from the face of the fixed element 23. It will be noted that the area of the face of the piston 35 is approximately equal to or greater than the area of either of the port openings 26 or 28 so that the steam entering the passage 27 will bear against this piston 35 as against a fixed abutment and will also press against the front wall of the passage or space 27 and thus the pressures will be balanced. If this were not the case, the pressure of steam entering through the port 26 and the reactive pressure of the steam passing out through the port 28 would be great enough to force the disk valve rearward against the action of the spring 31.

By this means I have provided for balancing the valve.

It is to be noted that the port 26 is located a less distance from the axial center of the rotatable element 25 than is the port 28. Thus the port 26 never comes into coincidence with the bore of the valve 43 nor does the port 28 ever come into coincidence with the bore of the valve 37. Thus steam is admitted to the engine only upon one rotation of the element 25 when the ports 26 and 28 both register with the bores of the valves 37 and 43. The rotation of shaft 29 is timed so that this occurs immediately after the full cycle of the internal combustion engine has been completed. It then cuts off the admission of steam and the steam is not again admitted until the cycle of the internal combustion engine has been again completed and so on. As illustrated, the steam is generated by the hot exhaust gases surrounding the coil 29. This is purely illustrative.

In Figures 5 to 7, I show a modified form of valve operating on the same principle as the valve shown in Figures 1 to 3. In these figures the stationary portion of the valve is designated 47, the rotatable element being designated 48. The element 47 is provided with the inlet port shown in dotted lines in Figure 4 and designated 49 and with the outlet port 50 opening into the space 14 of the engine, the passage from the port 50 into the space 14 being controlled by the check valve 51 of the character previously described and used for the reasons stated. The rotatable element 48 is rotatably mounted upon the shaft 52 and the shaft 52 is provided with the piston head 53 disposed within the recess 54 for the purpose, as previously stated, with relation to the element 25. A spring 55 urges the rotatable element 48 against the fixed element 47.

While the element 25 is provided with a diametrically extending steam passage 27, the rotatable element 48 is provided with a steam passage 56 which extends at an inclination of approximately 20° to a diametric line cutting the axes of disk 48 and port 53, the recess 54, of course, opening into this steam space 56. The passage 56, of course, opens upon the face of the rotatable element 48 by means of the two ports 57 and 58. It will be seen that the passage 56 is disposed tangentially with relation to a circle concentric to the center of rotation of the member 48. The face of the element 47 has attached to it a plate 59 through which the port 49 opens and which opposite the entrance to port 50 is provided with a plurality of apertures 60. The rotatable element 48 revolves against this plate 59, the contacting face being lubricated by means of the lubricant duct 61 and the cup 62. Immediately behind the apertures 60 the stationary element 47 is transversely recessed upon its face to form a guideway 63 and disposed in this guideway, as shown in Figure 5, are the two slide valves 66 and 67. These are urged against the face of the plate 59 by means of the springs 68 disposed in pockets in the member 47.

For the purpose of shifting these slides 66 and 67, I provide the oppositely disposed handles or stems 69 passing each through a stuffing box 70. Each of these stems 69 is connected, as shown in Figure 6, to a lever 71 whereby the slide valve may be adjusted to close more or less of the perforations of the portions 60. The valve 66 constitutes the admission valve and may be shifted across the opening 60 to advance the period of admission or retard the period of admission.

The valve 67 constitutes the cut-off valve and by shifting this valve toward the left in Figures 5 and 6, the steam will be cut off earlier than when the valve is shifted toward the right in Figure 6. In Figure 5, the valves are shown as being so disposed that steam is admitted immediately, with the piston in the position shown in Figure 12 and moving downward, and the steam will continue to pass into the cylinder throughout the entire movement of the piston. By regulating the cut-off valve 67, steam may be cut off at any point in the movement of the piston and used expansively as previously described for the structure shown in Figures 1 to 3.

It is to be particularly noted with regard to the structure shown in Figures 4 to 7 that in this case it is the inclination of the passage 56 which prevents both ports 57 and 58 registering with the passages 49 and 63 more than once for each complete revolution of the valve whereas in Figure 1 this is accomplished by making the port 26 nearer to the center of rotation of the valve than port 28.

Attention is called to the fact that in the structure shown in Figures 5 to 7, the rotatable element 48 rotates against a perfectly flat plate 59 so that there is a minimum of friction and in which there are no joints through which the steam may seep or leak. This plate 59, of course, is held in engagement with the stationary member 47.

By using a rotatable valve structure, this mechanism may be applied to a high-speed engine which is not the case where slide valves are used or where an oscillating or reciprocating valve must be used. These valves involve an extremely rapid and constant change in direction and such valves cannot be practically operated at a very high speed. A rotatable valve on the other hand because there is no change in its direction and it rotates with a constant speed in one direction can be operated at a very high speed and a structure can be used wherein one flat surface operates against another flat and correspondingly ground surface so that there is a minimum of friction and a minimum of complication.

It is obvious that the exhaust valve 15 may be operated by any of the usual cam structures for this purpose. Inasmuch as my construction does not relate to any particular means for controlling the exhaust valves nor to any details of the combustion engine structure, I have not illustrated a specific exhaust valve for the steam nor illustrated any means whereby the exhaust valve may be operated.

It will be seen that I have provided in my construction a valve comprising a stator, a rotor operating against the face of the stator and an auxiliary valve controlling either the point of admission of steam to the rotor or the point of cut-off of steam. Obviously minor changes might be made in the details of construction and arrangements of parts without departing from the spirit of the invention as stated in the following claims.

I claim:—

1. A rotary valve for steam engines including a stator having a flat face, a confronting rotor having a flat face engaging against the flat face of the stator, the stator having an inlet port and an outlet port, the rotor having two ports, and a connecting passage, and shiftable means mounted in the stator and associated with one of said ports whereby the point of steam admission and the point of steam cut-off may be changed.

2. A rotary valve for steam engines including a stator having a flat face, a confronting rotor having a flat face engaging against the flat face of the stator, the stator having an inlet port and an outlet port, the rotor having two ports and a connecting passage, and rotatable auxiliary valves mounted in the stator, each having an eccentrically disposed bore opening upon the face of the stator and having communication with the ports in the stator, the auxiliary valves being shiftable to carry their bores into any one of a plurality of positions along the line of movement of the rotor port.

3. A rotary valve for steam engines including a stator having a flat face, a confronting rotor having a flat face engaging against the flat face of the stator, the stator having a steam inlet port and a steam outlet port, the rotor having two ports and a connecting passage between the ports, the ports in the rotor each being so disposed with relation to the other that each port in the rotor will coincide only with the corresponding port in the stator only once during each complete rotation of the rotor.

4. A rotary valve for steam engines of the character described, including a stator having a flat face, a confronting rotor having a flat face engaging against the flat face of the stator, the stator having a steam inlet port and a steam outlet port, the rotor having an inlet port and an outlet port, and a connecting passage between the two, the ports in the rotor being so disposed with reference to each other that the inlet port registers only with the inlet port of the stator and the outlet port of the rotor registers only with the outlet port of the stator and that the respective inlet and outlet ports of the rotor coincide with the inlet and outlet ports of the stator only once during each complete revolution of the rotor.

5. A rotary valve for steam engines including a stator having a flat face, a confronting rotor having a flat face engaging against the flat face of the stator, the stator having an inlet port and an outlet port, the rotor having two ports and a connecting passage, the ports in the rotor being so disposed with reference to each other and the ports in the stator that the inlet and outlet ports in the rotor coincide respectively with the inlet and outlet ports of the stator only once during each complete revolution of the rotor, and an auxiliary valve associated with each one of the ports of the stator and shiftable to shift each port opening in the stator in either direction along the line of movement of the coacting rotor port.

6. A rotary valve for steam engines including a stator having a flat face, a confronting rotor having a flat face engaging against the flat face of the stator, the stator having an inlet port and an outlet port, the rotor having two ports and a connecting passage, and a rotatable auxiliary valve mounted in each of the ports of the stator, each valve having an eccentrically disposed bore opening upon the face of the stator and having an arcuate slot in the side wall of the bore opening into the corresponding stator port, the auxiliary valves having handles upon the exterior of the stator whereby each valve may be rotatably shifted to carry its port into any one of a plurality of positions along the line of movement of the rotor port.

7. A rotary valve for internal combustion engines including a stator having a flat face, a confronting rotor having a flat face engaging against the flat face of the stator, the stator having an inlet port and an outlet port, the rotor having two ports and a connecting passage, the wall of the stator having a plurality of apertures and a pair of slide valves disposed within the stator in a plane inward of the plane of the wall having said apertures, said valves being independently shiftable to control the position of the effective port opening on a line coincident with the line of movement of the coacting rotor port.

8. A rotary valve for internal combustion engines including a stator having a flat face, a rotor having a confronting flat face, the stator having an inlet port and an outlet port, the outlet port being separated from the face of the rotor by a perforated wall, a pair of slide valves disposed one on each side of the outlet port of the stator and in a plane immediately behind the perforated wall whereby to adjustably occult the perforations on one side or the other of a median line, and manually operable means on the stator whereby either one of these slide valves may be independently shifted along the line of travel of the coacting rotor port.

9. A rotary valve for steam engines including a stator having a flat face, a confronting rotor having a flat face engaging against the flat face of the stator, the stator having a steam inlet port and a steam outlet port, the rotor having two ports and a connecting passage between the ports, the rotor ports being so disposed with relation to each other that the ports in the rotor will coincide with the ports in the stator only once during each complete rotation of the rotor, rotatable auxiliary valves mounted within the ports of the stator, each having an eccentrically disposed bore opening upon the face of the stator through the stator port, and each having communication at all times with the inlet and outlet ports of the stator, each eccentric auxiliary valve being independently shiftable to carry its bore into any one of a plurality of positions along the line of movement of the rotor ports.

10. A rotary valve for engines including a stator having a flat face, a confronting rotor having a flat face engaging against the flat face of the stator, an inlet port and an outlet port in the stator, two ports in the rotor adapted to register with the ports in the stator, once upon each full revolution of the rotor, the ports in the rotor having a connecting passage, and separate and independently adjustable means mounted upon the stator shiftable along the line of movement of the rotor ports to control the instance of admission and the instance of cut off.

11. A rotary valve for steam engines including a stator having a flat face, a confronting rotor having a flat face engaging against the flat face of the stator, an inlet port and an outlet port in the stator, two ports and a connecting passage in the rotor, the ports being adapted to register with the ports of the stator once upon each complete rotation of the rotor, and rotatable auxiliary valves mounted in the stator each having an eccentrically disposed bore opening upon the face of the stator and having communication respectively with the inlet port and the outlet port of the stator, each auxiliary valve being rotatable to thereby shift its bore into any one of a plurality of positions along the line of movement of the rotor port.

12. A rotary valve for steam engines including a stator having a flat face, a confronting rotor having a flat face engaging the flat face of the stator, the stator having an inlet port and an outlet port, the rotor having two ports and a connecting passage, the ports being adapted to register with the ports of the stator once during each revolution of the rotor, a shaft upon which the rotor is mounted and extending through the rotor to the interior thereof, means for supporting the rotor for rotation with the shaft but permitting longitudinal movement of the rotor with relation to the shaft, a spring bearing against the rotor and holding it in tight contact with the stator, and the inner face of the rotor having a recess immediately surrounding the shaft opening and the shaft having a piston disposed in this recess, the area of the face of the piston being approximately equal to the area of the port openings whereby motive fluid entering the connecting passage will bear against this piston as against a fixed abutment to thus balance the pressure within the rotor.

13. A rotary valve for steam engines including a stator having a flat face, a confronting rotor having a flat face engaging against the flat face of the stator, the stator having an inlet port and an outlet port, the rotor having two ports and a connecting passage, and shiftable means mounted in the stator and associated with the outlet port whereby the point of steam admission and the point of cut-off may be changed.

14. A rotary valve for steam engines including a stator having a flat face, a confronting rotor having a flat face engaging against the flat face of the stator, the stator having an inlet port and an outlet port, the rotor having two ports and a connecting passage, the wall of the stator having a plurality of apertures and a pair of slide valves disposed within the stator in a plane inward of the plane of the wall having said apertures, said valves being independently shiftable to control the position of the effective port opening on a line coincident with the line of movement of the coacting rotor port.

15. A rotary valve for steam engines including a stator having a flat face, a confronting rotor having a flat face and having two ports connected by a passage, the stator having an inlet port and an outlet port, the outlet port being separated from the face of the rotor by a perforated wall, a pair of slide valves disposed one on each side of the outlet port of the stator and in a plane immediately behind the perforated wall whereby to adjustably occult the perforations on one side or the other of a median line, and manually operable means on the stator whereby either one of these slide valves may be independently shifted along the line of travel of the coacting rotor port.

CLARENCE E. FOWLER.